United States Patent [19]

Vandenbossche

[11] 4,310,182
[45] Jan. 12, 1982

[54] INTERNAL COUPLINGS FOR PLASTIC SOLAR COLLECTORS AND THE LIKE

[75] Inventor: Benjamin E. Vandenbossche, Hillsborough, Calif.

[73] Assignee: Sealed Air Corporation, Saddle Brook, N.J.

[21] Appl. No.: 48,726

[22] Filed: Jun. 15, 1979

[51] Int. Cl.³ .................. F16L 35/00; B65D 51/00; F16L 41/04; F16L 55/00
[52] U.S. Cl. .................. 285/40; 138/89; 126/448; 165/178; 165/76; 285/239; 285/353; 285/423
[58] Field of Search .................. 138/89; 285/40, 239, 285/238, 353, 423, DIG. 19, 255; 167/76, 178; 126/448, 447

[56] References Cited

U.S. PATENT DOCUMENTS

| 2,580,818 | 1/1952 | Mundy et al. | 285/40 |
| 2,648,283 | 8/1953 | Coursen et al. | 138/89 |
| 3,157,203 | 11/1964 | Nooy | 138/89 |
| 3,245,701 | 4/1966 | Leopold et al. | 285/239 |
| 3,893,487 | 7/1975 | Engelking | 138/89 |

FOREIGN PATENT DOCUMENTS

| 446021 | 1/1948 | Canada | 285/355 |
| 2354554 | 5/1974 | Fed. Rep. of Germany | 285/355 |

Primary Examiner—Steven L. Stephan
Attorney, Agent, or Firm—Lerner, David, Littenberg & Samuel

[57] ABSTRACT

A self-tapping coupling for plastic piping has a hollow cylindrical section with external self-tapping threads and a sealing member with an O-ring whereby the sealing member is retained in the end of the plastic pipe by the threads cut by the cylindrical section when the latter is inserted in the end of the pipe with rotation.

6 Claims, 5 Drawing Figures

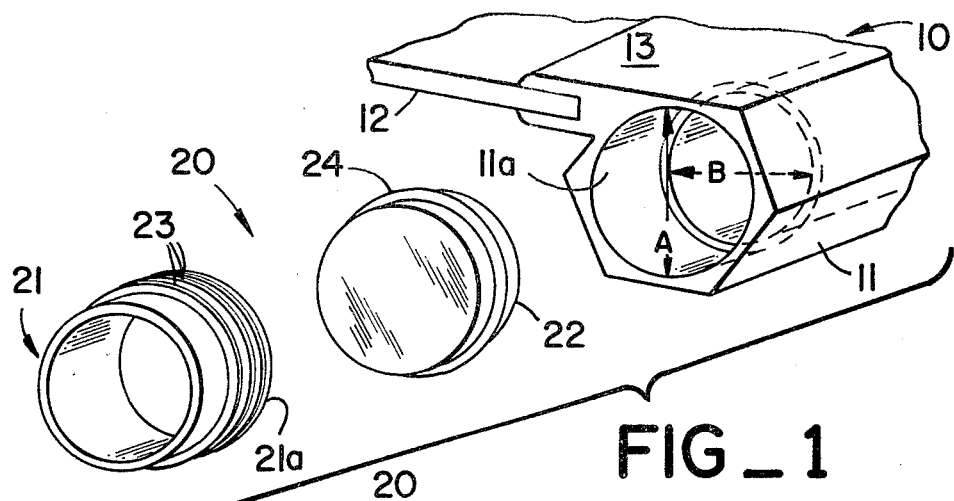
FIG_1
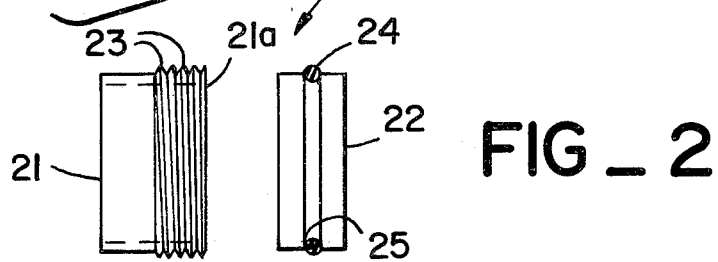
FIG_2
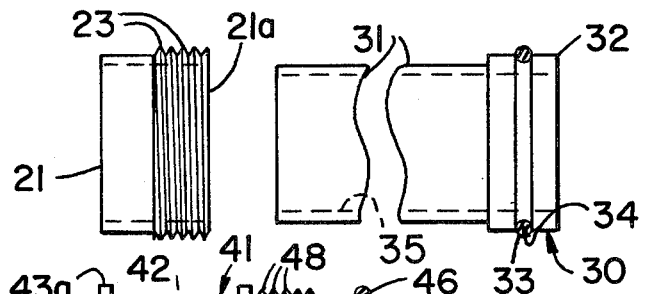
FIG_3
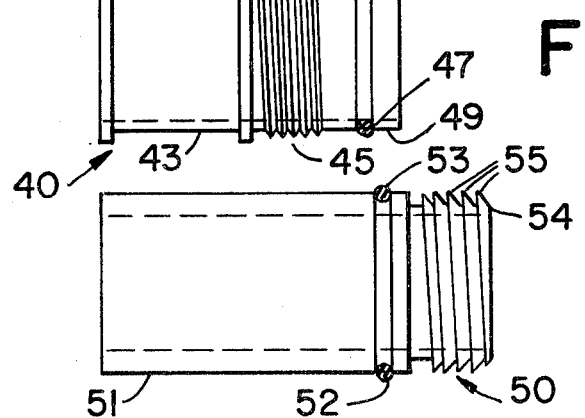
FIG_4
FIG_5

4,310,182

INTERNAL COUPLINGS FOR PLASTIC SOLAR COLLECTORS AND THE LIKE

BACKGROUND OF THE INVENTION

To harness solar energy, it is necessary to collect heat in a system or convert it directly to electricity through silicon solar cells. Systems for collecting solar energy vary. One of the more conventional systems involves circulating a fluid, such as water, through a collector unit. In such a unit, the solar energy impinging on the collector unit, through a heat exchange process, is transferred by conduction to the fluid. Obviously, the heated fluid can then be circulated to put the retained heat to useful purposes.

Such collector units can be constructed of glass, metal or plastic. Glass collectors are prohibitively expensive. Due to costs and other factors, plastic collector units appear to have an edge on units constructed of metal. With proper construction and compounding, plastic collector units have the advantage of a much lower cost coupled with resistance to corrosion, scaling and mild freezing conditions. These latter factors are extremely important in a direct circulation system where the pool or tap water passes through the collector unit, rather than accomplishing a heat transfer in a secondary heat exchanger device remote from the collectors.

Plastics which have been found especially suitable for collector units include the polyolefins, and particularly, the low-cost polyethylenes and polypropylenes. These latter plastics can be compounded with stabilizers to reduce ultra-violet degradation and are serviceable in environments where there is direct sunlight impingement on their surfaces, even when glazed enclosures are used to achieve a hot-house effect about such collector units. Temperatures of the collector units can be over 200° F. (93° C.) in such systems.

With the proper design parameters, these polyolefins make very acceptable solar collector units; however, they have a drawback when collectors fabricated from them are to be joined with the more conventional plastic piping such as ABS and/or PVC. ABS plastics, a family of amorphous thermal plastics, are a combination of the monomers of acrylonitrite, butadiene and styrene which can be solvent-welded like PVC (polyvinyl chloride) plastics. However, neither PVC nor ABS piping and/or fittings can be solvent-welded to the polyolefins. As a result, some mechanical connection must be effected between a collector unit constructed of a polyolefin and a conventional ABS or PVC plumbing system.

Because the polyolefins mentioned above are soft, especially at elevated temperatures found in collector unit applications, conventional mechanical coupling devices are typically unacceptable. Fittings connected with screws in the outlet piping of such a collector unit typically separate due to the deformation of the polyolefin occurring where the screw loading is concentrated. If the service pressure of the fluid circulating in the collector unit is increased to normal household line pressure (approximately 80 psi), the problem becomes more acute. This cold flow tendency of plastics under load is greatly increased under the elevated temperatures experienced in solar collector unit applications.

As a result, this invention is directed to an improved internal mechanical connector for solar collector units fabricated from polyolefins or the like. In addition, using the new mechanical connector of this invention, the collector unit can be disconnected from the plumbing without any damage to it, which is not possible if solvent welding is employed.

SUMMARY OF THE INVENTION

A mechanical coupling for plastic pipes of polyolefins or the like includes a cylindrical sleeve, the sleeve having a portion thereof with external self-tapping threads and a circular sealing member operably associated with the sleeve, with the circular sealing member having an O-ring groove centrally disposed on its outer cylindrical surface and an O-ring received in such groove, whereby the self-tapping threads of the sleeve member can be employed to cut internal threads into the end of a plastic pipe, enabling the sleeve to hold the circular sealing member in the end of the pipe and allowing the O-ring to effect a seal between the internal surface of the pipe and the sealing member.

The axial length of the cylindrical sealing member and its diameter should be adequate to stabilize it in the pipe. This prevents tipping of this member that may interfere with the O-ring line seal.

BRIEF DESCRIPTION OF THE DRAWINGS

This invention will be better understood by making reference to the accompanying drawings in conjunction with the written specification. In respect to the drawings:

FIG. 1 is a perspective of an end portion of a solar collector illustrating one of the hollow manifolds through which water or other fluids can be circulated along with an exploded perspective of an end plug closure fabricated according to this invention;

FIG. 2 is an elevation of the end plug closure shown in FIG. 1;

FIG. 3 is an embodiment of the invention shown in elevation wherein the plug portion shown in FIGS. 1 and 2 is replaced with a pipe nipple member; and FIGS. 4 and 5 are elevations of two alternate embodiments of the invention employing integral sleeve and sealing member parts for connecting a plastic collector unit to a piping or plumbing system.

DESCRIPTION OF THE PREFERRED EMBODIMENTS

In FIG. 1, a broken-away perspective of a solar collector unit 10 is shown. It is composed of a hollow manifold pipe 11 at each end (only one being shown) with a plastic collector element 12 connected between the two manifold pipes. A distributor structure 13 interconnects the ends of the collector element and each manifold pipe as shown, and flows liquid to and from the multiple channels of the collector element.

Each end of each manifold pipe 11 of the collector unit 10 has a counter bore 11a providing a stepped bore when progressing into the manifold pipe. (This is best shown in FIG. 1.) The internal diameter A of the counter bore of the manifold pipe at its distal ends is larger than the internal diameter B of the central bore of this pipe. By machining the counter bore in the pipe, a smooth, regular sealing surface is provided.

Multiple collector units 10 are normally nested together in a side-by-side arrangement on a roof in a typical system. Floating couplings are employed between contiguous units and the outmost units must have their manifold pipes 11 closed off or connected to the plumbing used with the system. The current invention is related to making the necessary mechanical connection to the manifold pipe, whether it is a connection to the plumbing or merely closing off the end of the manifold pipe.

To close off an end of a manifold pipe 11, a two-piece internal coupling 20, according to this invention, can be employed. It includes a hollow cylindrical sleeve 21 and a plastic plug 22.

The hollow sleeve 21 is typically constructed of metal, such as iron or brass, as can best be seen in FIG. 2. It has a threaded end 21a with external threads 23. The threads are essentially a type of self-tapping pipe thread, from a smaller diameter progressively to a larger diameter from the distal end toward the central section of the sleeve. The counter bore 11a in the end of the manifold pipe should be 70% to 90% of the diameter of the self-tapping threads on the sleeve to avoid breakage of the pipe as the sleeve is turned into the end of this counter bore to cut original internal threads therein.

Prior to the insertion of the threaded end 21a of the sleeve 21 into the end of the manifold pipe 11, the plug 22 is inserted. This plug is nothing more than a cylindrical slug with an O-ring 24 centrally disposed thereon, as shown in FIGS. 1 and 2. A matching O-ring groove formed in the plug is cut to a depth of at least half the diameter of the O-ring and, of course, both the plug and the O-ring are sized to give a satisfactory seal in the counter bore 11a.

Once the plug 22, with its assembled O-ring, is inserted into the open end of the counter bore of the manifold pipe 11, it is followed by the sleeve 21 which forces it axially into the counter bore. When the external threads 23 of the sleeve engage the counter bore, a pipe wrench can be employed to rotate the sleeve until it has threadedly seated in the end of the manifold pipe.

It can be appreciated that the plug 22 essentially floats in the counter bore 11a. Thus the hydraulic forces tending to force the plug out of the end of the counter bore are resisted by threaded engagement between the sleeve and the manifold pipe when the plug abuts against the internal end of the sleeve. Because the threaded engagement provides a substantial circular area of interference contact between these parts, the hydraulic load is distributed uniformly and the tendency of the plastic to cold flow will not be sufficient to allow the sleeve to be pushed out of the end of the manifold pipe. Of course, the area of the counter bore 11a where the self-tapping sleeve 21 cuts threads cannot be pre-threaded, because the O-ring or the plug could be damaged when passing over such threads. Further, when the unit is fabricated, it is unknown whether its manifold pipe will need to be closed off or coupled with a plumbing system, or connected as a central unit in a nest of such units. Thus pre-threading the counter bore 11a is not desirable, as it limits the flexibility of the units.

In place of plug 22, it is also possible to use the self-tapping sleeve 21 with a nipple 30 as is shown in FIG. 3. This nipple has a construction much like the plug, but includes a tubular extension 31 that is received in the bore of the hollow sleeve 21. This tubular extension is typically made of ABS or PVC plastic, as is the head 32 of the nipple. Like the plug, the head includes an O-ring 33 which is received in a circular groove 34 cut in the central peripheral surface of the head. A bore 35 extends completely through the nipple, and once the nipple is secured with the sleeve 21, a piping system of ABS or PVC can be solvent-welded to the distal end of the tubular extension to connect the collector unit into a plumbing system.

In FIG. 4, an integral construction for the internal coupling is shown. It is similar to the two-part embodiment shown in FIG. 3. This integral coupling 40 is basically a unitary cylindrical tube 41 having a central bore 42 with an outer cylindrical portion 43 and an inner cylindrical portion 44 connected with a self-tapping threaded central portion 45. The distal end of the outer cylindrical portion includes a flared rim 43a that assists in sealingly connecting hoses and the like. The inner cylindrical portion has a slightly smaller outer diameter, and its central section includes an O-ring 46 in a pre-formed groove 47.

Since the threads 48 on the central portion 45 of the integral coupling 40 are of the same self-tapping construction as the threads on the sleeve 21, it can be appreciated that this coupling can be inserted into the end of the manifold pipe 11 until the threads engage the counter bore and a pipe wrench used on the outer portion 43 to rotate it until matching threads have been cut in the counter bore 11a of the collector unit 10. Normally, the integral unit is constructed of iron or brass.

The integral coupling 50 shown in FIG. 5 is a slight variation of the one shown in FIG. 4. It also uses a tubular member 51, but can be constructed of metal or plastic. It is adapted to fit snugly into the counter bore 11a of the manifold pipe 11. Located centrally on the tubular member is an O-ring groove 52 in which an O-ring 53 is received. The coupling is hollow and includes a tapered end 54 which is equipped with self-tapping threads 55 capable of cutting new threads in a polyolefin pipe structure. In this embodiment, the threads on the coupling 50 engage the smaller inner diameter B of the manifold pipe 11. Since the outer diameter of threads 55 is smaller than the diameter of the counter bore 11a, the passage of the self-tapping threads across the surfaces of the counter bore will not scratch or mar this sealing surface.

Again, the end coupling 50 protruding from the manifold pipe 11 can be grasped with a wrench and the coupling turned to cut threads into the smaller internal bore of the pipe.

I claim:

1. In combination, a plastic manifold for a solar collector panel, said manifold including an open end and a counterbore formed in said open end to provide an internal shoulder within said manifold; and an internal fitting removeably received in said counterbore of said manifold for controlling fluid flow therethrough, said internal fitting including a first member positioned in said counterbore of said manifold for axial movement relative thereto, said first member having a first external surface located interiorally of said manifold and first permitting means for permitting fluid to pass through said first member, a second member fixedly positioned in said counterbore of said manifold, said second member having a second external surface positioned between said first external surface of said first member and said open end of said manifold and second permitting means for permitting fluid to pass through said second member, said second permitting means being in fluid communication with said first permitting means so that fluid can flow through said fitting and hence through said open end of said manifold, sealing means provided on said first external surface of said first member for forming a fluid-tight seal between said first external surface of said first member and an internal surface of the counterbored portion of said manifold, connecting means provided on said first member for connecting said fitting to a conduit, said connecting means passing through said second member, and thread-cutting means provided on said second external surface of said second member for cutting internal threads in said manifold, said thread-cutting means cooperating with the internal threads cut by said thread-cutting means to fixedly position said second member in said counterbore of said manifold, whereby said second member prevents the inadvertent removal of said first member from said open end of said manifold.

2. A combination according to claim 1, wherein said connecting means passes through said first permitting means and extends exteriorally of said manifold.

3. A combination according to claim 2, wherein said second member is made from a plastic selected from a group consisting of ABS and PVC plastics.

4. A combination according to claim 3, wherein said sealing means is an O-ring.

5. A combination according to claim 4, wherein said thread-cutting means is a plurality of self-tapping threads.

6. A method of coupling a plastic manifold of a solar collector panel to a plastic conduit such that fluid may flow between the conduit and an open end of the manifold, comprising the steps of counterboring the open end of the manifold to form a counterbore therein; providing an internal fitting which includes a first member, said first member being manufactured from plastic and including sealing means for forming a fluid-tight seal, connecting means for connecting said first member to the conduit and first permitting means for permitting fluid to pass through said first member, and a second member, said second member including thread-cutting means for cutting internal threads and second permitting means for permitting fluid to pass through said second member; inserting said first member of said fitting into the counterbore of the manifold such that said sealing means forms a fluid-tight seal between an external surface of the sealing means and an internal surface of the manifold; inserting said second member of said fitting into the counterbore of the manifold such that said second permitting means communicates with said first permitting means so as to permit fluid to flow through said fitting, said connecting means extends through said second member and said thread-cutting means cuts internal threads into the internal surface of the manifold in such a manner that said thread-cutting means cooperates with the internal threads to fixedly position said second member in the counterbore of the manifold and to prevent the inadvertent removal of said first member from the open end of the manifold; and solvent bonding said connecting means of said first member to the conduit.

* * * * *